US012096122B2

(12) United States Patent
Asakawa

(10) Patent No.: US 12,096,122 B2
(45) Date of Patent: Sep. 17, 2024

(54) IMAGE SENSOR DRIVING DEVICE, CAMERA DEVICE AND ELECTRONIC APPARATUS

(71) Applicant: New Shicoh Motor Co., Ltd., Zhejiang (CN)

(72) Inventor: Shinroku Asakawa, Yamato (JP)

(73) Assignee: NEW SHICOH MOTOR CO., LTD, Zhejiang (CN)

(*) Notice: Subject to any disclaimer, the term of this patent is extended or adjusted under 35 U.S.C. 154(b) by 79 days.

(21) Appl. No.: 17/950,598

(22) Filed: Sep. 22, 2022

(65) Prior Publication Data
US 2023/0090603 A1 Mar. 23, 2023

(30) Foreign Application Priority Data

Sep. 23, 2021 (CN) ............ 202111115947.3
Sep. 23, 2021 (CN) ............ 202111117449.2
Sep. 23, 2021 (CN) ............ 202111117454.3

(51) Int. Cl.
H04N 23/54 (2023.01)
H04N 23/68 (2023.01)

(52) U.S. Cl.
CPC .......... H04N 23/687 (2023.01); H04N 23/54 (2023.01)

(58) Field of Classification Search
CPC .... H04N 23/687; H04N 23/54; H04N 23/682; H04N 23/50; H04N 23/57; H04N 23/51; H04N 23/68
See application file for complete search history.

(56) References Cited

U.S. PATENT DOCUMENTS

| 8,090,248 B2* | 1/2012 | Akutsu ............ G03B 5/00 348/208.99 |
| 9,979,869 B2* | 5/2018 | Park ............ H04N 23/6812 |
| 10,356,325 B2* | 7/2019 | Nishitani ......... H04N 5/23287 |
| 2017/0171440 A1 | 6/2017 | Park et al. |

* cited by examiner

Primary Examiner — Ahmed A Berhan
(74) Attorney, Agent, or Firm — Hayes Soloway PC

(57) ABSTRACT

An image sensor driving device including: a fixed portion; a movable portion that supports an image sensor receiving incident light passing through a lens and is rotatable relative to the fixed portion around a rotation axis passing through a light receiving surface of the image sensor and being orthogonal to the light receiving surface; a fulcrum member arranged on the rotation axis; three support balls arranged to surround a periphery of the fulcrum member; a first urging portion urging the movable portion in a direction of pressing against the fixed portion via the three support balls; a second urging portion pressing by sandwiching the fulcrum member between the fixed portion and the movable portion; and a driving portion rotatively driving the movable portion with respect to the fixed portion.

11 Claims, 9 Drawing Sheets

IMAGE SENSOR DRIVING DEVICE, CAMERA DEVICE AND ELECTRONIC APPARATUS

CROSS-REFERENCE TO RELATED APPLICATIONS

This application claims the benefit of Chinese Patent Application No. 202111117454.3, No. 202111115947.3, and No. 202111117449.2, all filed on Sep. 23, 2021, which are hereby incorporated by reference herein in their entirety.

TECHNICAL FIELD

The present disclosure relates to an image sensor driving device used in electronic apparatus such as smartphones, a camera device and an electronic apparatus.

BACKGROUND

A camera device with a sensor shift image stabilizing system function includes a fixed portion with a lens device and a movable portion with an image sensor, and drives the movable portion to rotate around an optical axis of the lens device in the fixed portion.

A camera device disclosed in U.S. Patent Publication No. 2017/0171440 (Patent Document 1) has a housing supporting a lens assembly, and a rotation member which is rotatably supported with respect to this housing and to which an image sensor is fixed. This rotation member has three ball receiving grooves lined up along the same circumference, and is supported by the housing via the three balls supported in the ball receiving grooves. In this camera device, an FPC (Flexible printed circuits) is connected to the image sensor. Further, a camera device disclosed in FIG. 5 of Patent Document 1 has a housing supporting a lens assembly, and a rotation member which is rotatably supported with respect to this housing and to which an image sensor is fixed.

SUMMARY

In the technology disclosed in Patent Document 1, the center of the circumference where the three ball receiving grooves are lined up is a rotation center of the rotation member, which is a movable portion. However, in the technology disclosed in Patent Document 1, since the ball supported by the ball receiving groove may get on the groove, in the image sensor driving device disclosed in the movable portion Patent Document 1, the FPCs are led out from the left side and the right side of the image sensor, integrated into one, and led out outward in the radial direction of the rotation member orthogonal to it, so that the load of the actuator that the FPC rotatively drives the rotation member is unbalanced, thus, there is a problem that the rotation axis of the rotation member is shaken. That is, there is a problem that the position of the rotation center of the movable portion is unstable. Further, in the image sensor driving device disclosed in Patent Document 1, the FPC is led out from the left side and the right side of the image sensor, integrated into one, and led out outward in the radical direction of the rotation member orthogonal to it, so the load of the actuator that the FPC rotatively drives the rotation member is unbalanced, thus, there is a problem that the rotation axis of the rotation member is shaken. Further, in order to improve the stability of rotation control in the image sensor driving device that rotatively drives the movable portion with respect to the fixed portion, the influence of resonance amplitude of the movable portion must be reduced. For this purpose, it is necessary to interpose a resin (gel damper material) with viscoelasticity between the movable portion and fixed portion for damping. However, the shape and position of the gel damper material were not stable simply by interposing the gel damper material and the damping effect became unstable.

The present disclosure firstly aims to provide an image sensor driving device, a camera device and an electronic apparatus capable of improving the position accuracy of the rotation center of a movable portion. The present disclosure secondary aims to provide an image sensor driving device, a camera device and an electronic apparatus capable of reducing the shaking of the rotation axis caused by an FPC (Flexible printed circuits). The present disclosure thirdly aims to provide an image sensor driving device, a camera device and an electronic apparatus capable of stably dampen by a gel damper material.

To achieve the above-described objects, in accordance with a first aspect of the present disclosure, there is provided an image sensor driving device including: a fixed portion; a movable portion that supports an image sensor receiving incident light passing through a lens and is rotatable relative to the fixed portion around a rotation axis passing through a light receiving surface of the image sensor and being orthogonal to the light receiving surface; a fulcrum member arranged on the rotation axis; three support balls arranged to surround a periphery of the fulcrum member; a first urging portion urging the movable portion in a direction of pressing against the fixed portion via the three support balls; a second urging portion pressing by sandwiching the fulcrum member between the fixed portion and the movable portion; and a driving portion rotatively driving the movable portion with respect to the fixed portion.

In accordance with a second aspect of the present disclosure, there is provided a camera device including the image sensor driving device described above.

In accordance with a third aspect of the present disclosure, there is provided an electronic apparatus including the camera device described above.

Further features of the present invention will become apparent from the following description of exemplary embodiments (with reference to the attached drawings).

BRIEF DESCRIPTION OF DRAWINGS

FIG. 2 is a perspective view in which a prism 101 and the image sensor driving device 106 shown in FIG. 1 are seen through;

DETAILED DESCRIPTION

Figure 1:
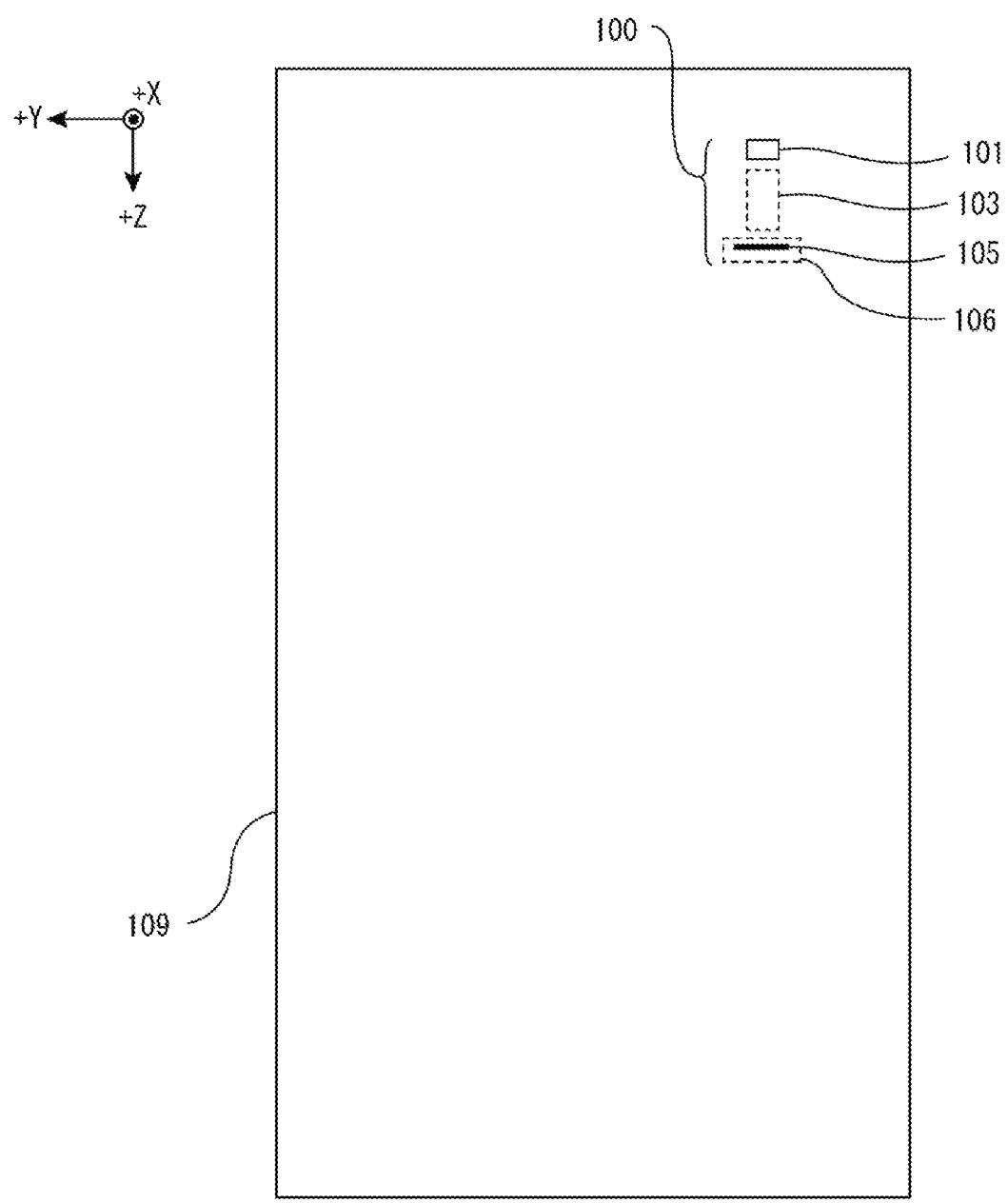
FIG. 1 is a front view of a smartphone 109 on which a camera device 100 including an image sensor driving device 106 according to one embodiment of the present disclosure is mounted.

As shown in FIG. 1, a camera device 100 including an image sensor driving device 106 according to one embodiment of the present disclosure is accommodated in a housing of a smartphone 109. The camera device 100 has a prism 101, a lens body 103, an image sensor 105, and an image sensor driving device 106 driving the image sensor 105.

In the following, as shown in FIG. 2 through FIG. 9, an XYZ rectangular coordinate system consisting of an X axis, a Y axis and a Z axis orthogonal to each other is assumed, and the configuration of each portion of the present embodiment is explained. The X axis is an axis in a direction in which incident light from a subject arrives to the smartphone 109, and the Z axis is an axis in a direction orthogonal to the X axis and is an axis in an optical axis direction of the lens body 103, and was set in a long side direction of the housing of the smartphone 109 in the present embodiment. The Y axis is an axis in a direction orthogonal to the X axis and the Z axis.

Figure 2:
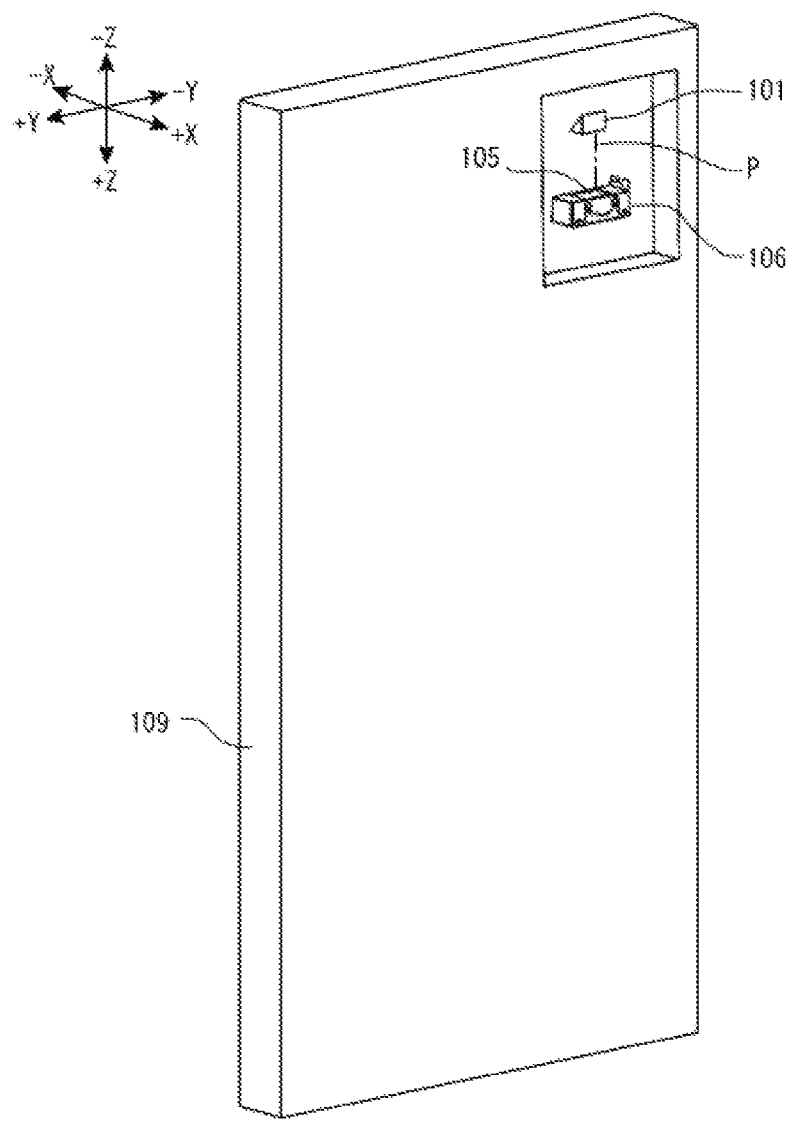

As shown in FIG. 2, incident light from the subject enters the prism 101, the optical axis is bent by 90° by the prism 101, and proceeds in the +Z direction. The incident light in the +Z direction passes through the lens body 103 (not shown in FIG. 2) and reaches the light receiving surface 107 (see FIG. 4) of the image sensor 105 of the image sensor driving device 106. The image sensor 105 converts the light guided through the lens body 103 into an image signal and outputs the image signal. The image sensor driving device 106 drives the image sensor 105 around a virtual rotation axis P (see FIGS. 2, 4 and 6) passing through the center of the light receiving surface 107 and perpendicular to the light receiving surface 107. Normally, the rotation axis P coincides with the optical axis (Z axis) of the lens body 103.

Figure 3:
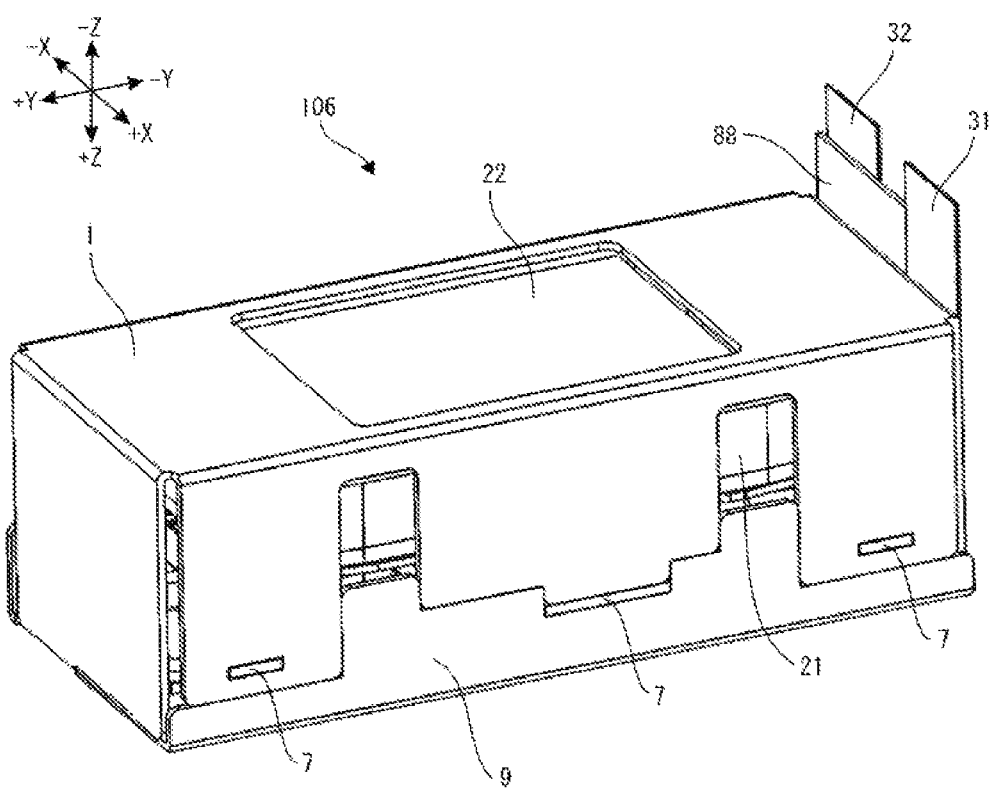
FIG. 3 is a perspective view of the image sensor driving device 106 shown in FIG. 2.
Figure 4:
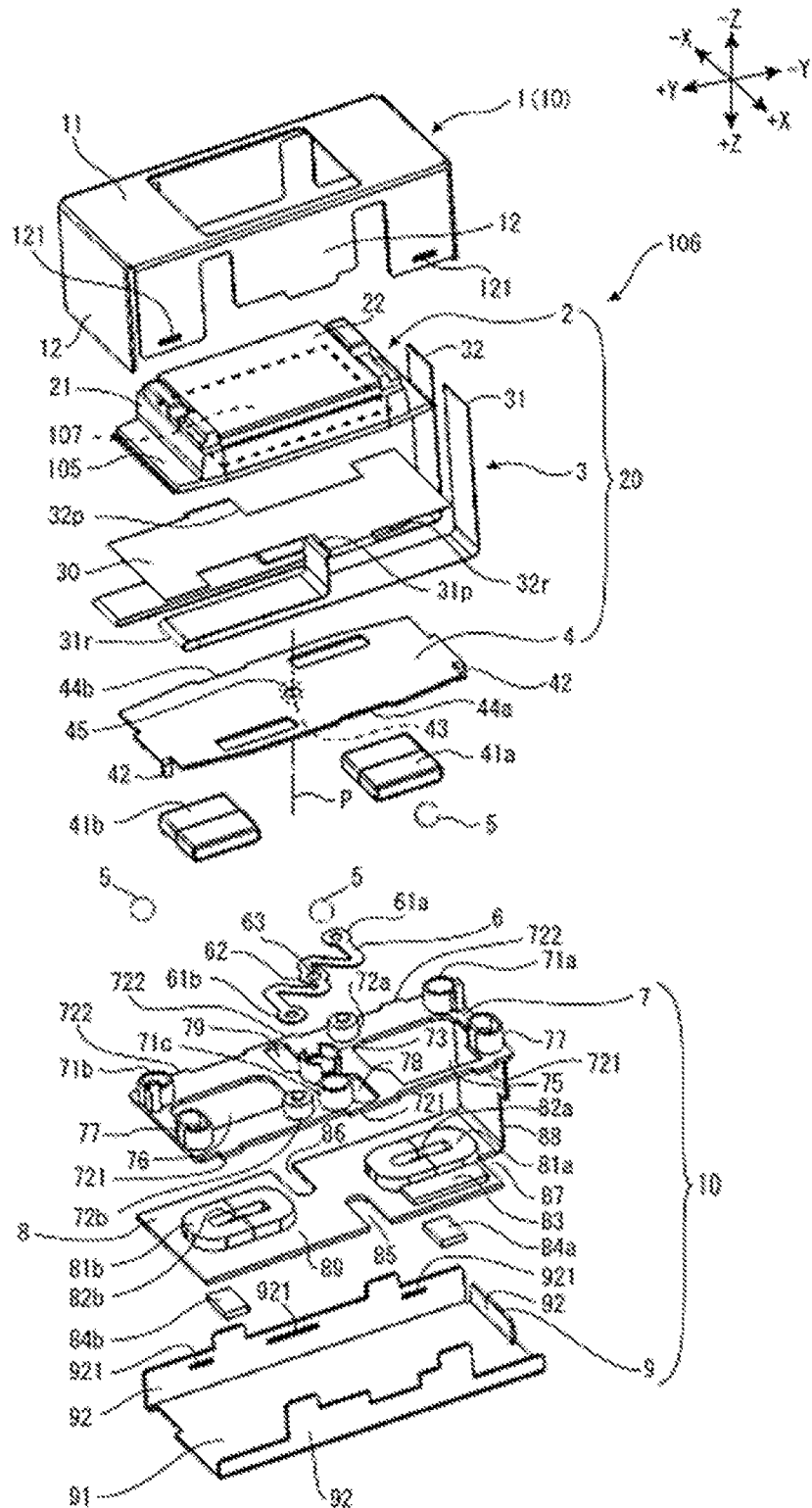
FIG. 4 is an exploded perspective view of the image sensor driving device 106 shown in FIG. 2.

As shown in FIG. 3 and FIG. 4, the image sensor driving device 106 has an upper housing 1, an imaging portion 2, a circuit portion for movable portion 3, a plate 4, three support balls 5, a leaf spring 6, a base 7, a circuit portion for fixed portion 8 and a lower housing 9. Of these portions, the upper housing 1 and the lower housing 9 are combined as a housing. The imaging portion 2, the circuit portion for movable portion 3, the plate 4, the three support balls 5, the leaf spring 6, the base 7, and the circuit portion for fixed portion 8 are accommodated in this housing.

In FIG. 4, the upper housing 1, the base 7, the circuit portion for fixed portion 8, and the lower housing 9 constitute a fixed portion 10. Further, the imaging portion 2, a portion of the circuit portion for movable portion 3, and the plate 4 constitute a movable portion 20. The movable portion 20 is rotatable around the rotation axis P with respect to the fixed portion 10.

As shown in FIG. 4, the upper housing 1 has a rectangular ceiling plate 11 provided with an opening portion, and four side plates 12 extending in the +Z direction from four sides of the ceiling plate 11. The lower housing 9 has a rectangular bottom plate 91 and three side plates 92 extending in the −Z direction from three sides of the bottom plate 91. The ceiling plate 11 and the bottom plate 91 have approximately the same dimensions and are short in the X direction and long in the Y direction. That is, the dimension in the thickness direction of the smartphone 109 is small. Slits 121 extending in the Y direction are provided at two end portions in the Y direction of the side plate 12 on the +X side of the upper housing 1, respectively. Slits 921 extending in the Y direction are provided at two end portions in the Y direction and the middle portion of the side plate 92 on the −X side of the lower housing 9.

The imaging portion 2 has a sensor housing 21, a filter 22 fixed on the −Z side of the sensor housing 21, and an image sensor 105 fixed on the +Z side end surface of the sensor housing 21. The light receiving surface 107 of the image sensor 105 is provided at the inside surrounded by the sensor housing 21. The incident light passing through the lens body 103 passes through the filter 22 via the opening portion of the ceiling plate 11 of the upper housing 1, and is focused on the light receiving surface 107 of the image sensor 105. A FPC (Flexible Printed Circuits) base for movable portion 30 of the circuit portion for movable portion 3 is arranged on the +Z side lower portion of the image sensor 105. A circuit that supplies power to the image sensor 105, a circuit that supplies a control signal to the image sensor 105, and a circuit receiving an image signal from the image sensor 105 are formed at the circuit portion for movable portion 3.

Figure 5:
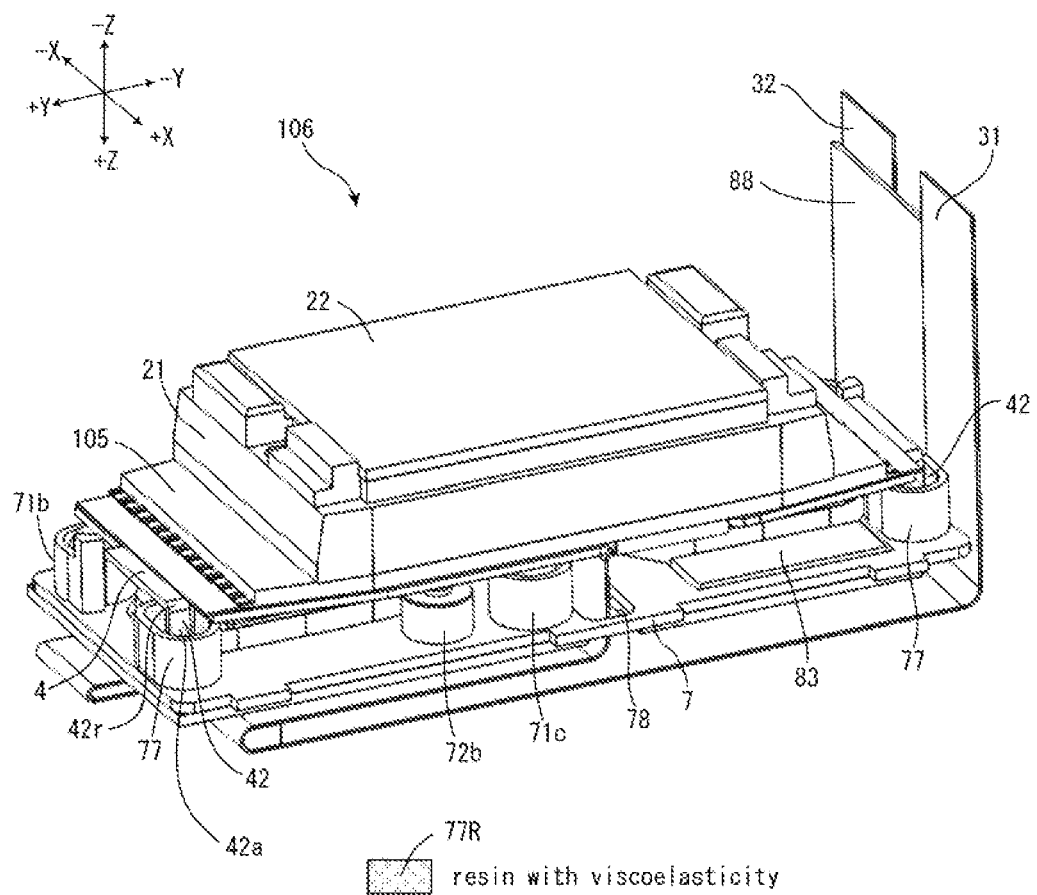
FIG. 5 is a perspective view in which a housing is removed from the image sensor driving device 106 shown in FIG. 3.
Figure 6:
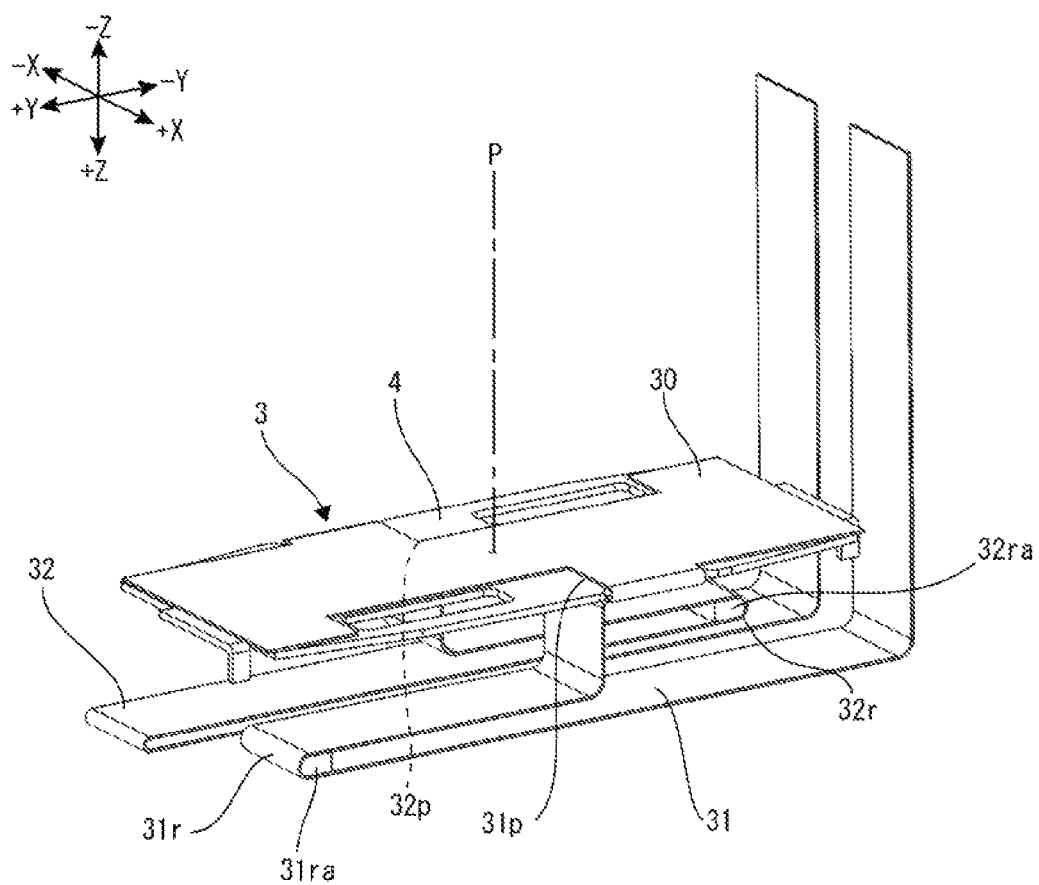
FIG. 6 is a perspective view of a circuit portion for movable portion 3 shown in FIG. 4.

As shown in FIGS. 4 to 6, the circuit portion for movable portion 3 has the FPC (Flexible Printed Circuits) base for movable portion 30 connected to the image sensor 105, a first FPC (Flexible Printed Circuits) extension portion 31 and a second FPC (Flexible Printed Circuits) extension portion 32. The FPC base for movable portion 30 of the circuit portion for movable portion 3 expands parallel to the light receiving surface 107 and is fixed to the surface on the −Z side of the substantially rectangular plate 4 to fix the imaging portion 2. Further, the image sensor 105 of the imaging portion 2 is electrically connected to the FPC base for movable portion 30.

The first FPC extension portion 31 is provided in a strip shape on the +X side portion of the FPC base for movable portion 30, led out from the vicinity of the middle of the +X side edge of the FPC base for movable portion 30 to the +X side portion, bent by 180 degrees in the +Z direction with the plate 4 sandwiched therebetween as shown in the enlarged view of FIG. 6, hereafter bent by 90 degrees in the +Z direction at the +Y side end of the bent tip as a proximal end portion 31p, and led out by a predetermined length in the +Z direction. The first FPC extension portion 31 accommodated in an upper space passes through a hole 78 (see FIG. 4) of the base 7 and a notch portion 85 (see FIG. 4) of the circuit portion for fixed portion 8 as a path portion to be accommodated in a lower space to be described later. Further, The first FPC extension portion 31 is bent in the +Y direction by 90 degrees at the led tip in the +Z direction, hereafter extends parallel to a surface of the FPC base for movable portion 30 in the +Y direction, is inverted in the −Y direction at an inversion portion 31r, extends parallel to a surface of the FPC base for movable portion 30 to the outside of the image sensor driving device 106 as shown in FIG. 3, and the end portion is fixed to the side plate 12 on the −Y side of the upper housing 1.

The second FPC extension portion 32 is provided in a strip shape on the −X side portion of the FPC base for movable portion 30, is led out from the FPC base for movable portion 30, is bent in the +Z direction as above at the proximal end portion 32p, hereafter passes from the upper space to the lower space through a hole 79 (see FIG. 4) of the base 7 and a notch portion 86 of the circuit portion for fixed portion 8 (see FIG. 4) as a path portion to be described later, and is provided point-symmetrically with the first FPC extension portion 31 until the second FPC extension portion 32 extends parallel to a surface of the FPC base for movable portion 30 after being bent and is inverted at an inversion portion 32r. The second FPC extension portion 32 inverted at the inversion portion 32r as above is inverted again at an end portion on the +Y direction of the FPC base for movable portion 30 so as to fold in the +Z direction, hereafter extends parallel to a surface of the FPC base for movable portion 30 in the −Y direction and extends to the outside of the image sensor driving device 106 as shown in FIG. 3, and the end portion is fixed to the side plate 12 on the −Y side of the upper housing 1. The inversion portions 31r, 32r are preferably located at positions close to the end portion in the +Y direction, or the end portion in the −Y direction of the FPC base for movable portion 30.

The first FPC extension portion 31 is led out from the FPC base for movable portion 30 so as to fit in the notch portion 44a (see FIG. 4) provided in the plate 4, and the second FPC extension portion 32 is led out from the FPC base for movable portion 30 so as to fit in the notch portion 44b (see FIG. 4), respectively. Further, the inside of the inversion portion 31r of the first FPC extension portion 31 and the inside of the inversion portion 32r of the second FPC extension portion 32 are fixed with adhesives 31ra, 32ra, respectively.

Thus, in the present embodiment, the first FPC extension portion 31 and the second FPC extension portion 32 are led out from the surface (the proximal end portion 31p and 32p) on the +Z side of the FPC base for movable portion 30 in the +Z direction, which is the optical axis direction, so the projection area in the optical axis direction of the image sensor driving device 106 can be reduced.

In FIG. 4, the plate 4 is a rectangular metal plate smaller than the ceiling plate 11. A center hole 45 is provided in the center of the plate 4, and the center of this center hole 45 is the position of the rotation axis P. On surface on the +Z side of the plate 4, a rotation center ball 43 is attached to the center hole 45 at a position corresponding to the rotation axis P of the movable portion 20, and is fixed by welding from the −Z side. Further, two magnets 41a and 41b arranged on the +Y side and the −Y side with the rotation center ball 43 interposed therebetween are fixed to the surface on the +Z side of the plate 4. The fixing positions of the magnets 41a and 41b are point-symmetric with respect to the rotation axis P. Further, protruding portions 42 are formed at two corners on the +X,+Y side and the +X,−Y side of the four corners of the plate 4 by bending the minute rectangular regions of the plate 4 at these positions to the +Z side. Further, a notch portion 44a is formed at the edge on the +X side of the plate 4, and a notch portion 44b is formed at the edge on the −X side.

As shown in FIG. 4, the base 7 is a metal plate having an approximately rectangular outer shape of almost the same size as the ceiling plate 11 and the bottom plate 91, and is an outsert molded article in which some portions protruding in the −Z direction on the surface on the −Z side to be described later are composed of resin. Three protruding portions 721 protruding to the +X side are provided at an edge on the +X side of the base 7. Further, three protruding portions 722 protruding to the −X side are provided at an edge on the −X side of the base 7. The protruding portions 721 at both ends are fitted into and fixed into the slits 121 of the upper housing 1, and the protruding portion 721 in the middle is sandwiched and fixed between the side plate 12 of the upper housing 1 and the side plate 92 of the lower housing 9. The three protruding portion 722 are fitted into and fixed into three slits 921 of the lower housing 9. Thus, an internal space by the upper housing 1 and the lower housing 9 is divided into an upper space above and a lower space below from the base 7. As shown in FIG. 5, a portion of the first FPC extension portion 31 and a portion of the second FPC extension portion 32 are accommodated in the lower space. The movable portion 20 is accommodated in the upper space.

As shown in FIG. 4, on the surface on the −Z side of this base 7, a ball receiving portion 71a is arranged protruding in the −Z direction at the corner portion on the −X,−Y side, and a ball receiving portion 71b is arranged protruding in the −Z direction at the corner portion on the −X,+Y side. Further, a ball receiving portion 71c is arranged protruding in the −Z direction in the vicinity of the middle of the edge portion on the +X side. The ball receiving portions 71a, 71b and 71c protrude in a cylindrical shape with a depressed center, respectively, the bottom surfaces of them are higher than other portions of the base 7, and all three have the same height and flat surfaces parallel to the lower surface (the +Z side surface) of the plate 4. One support ball 5 is accommodated in each of the ball receiving portions 71a, 71b and 71c. In the present embodiment, the support balls 5 have the same size and are smaller than the rotation center ball 43, but depending on the design, they may be larger than or have the same size as the rotation center ball 43. Each of the support balls 5 is in contact with the surface on the +Z side of the plate 4 and supports the movable portion 20.

Further, on the surface on the −Z side of the base 7, the first support portion 72a is provided at a position in the −Y direction from the middle of the edge portion on the −X side, and the second support portion 72b is provided at a position in the +Y direction from the middle of the edge portion on the +X side. Each of the first support portion 72a and the second support portion 72b has a column portion arranged on the surface on the −Z side of the base 7 and a small column portion protruding in the vicinity of the middle of the upper surface of this column portion. Further, a stopper portion 73 is arranged in the center of the surface on the −Z side of the base 7. This stopper portion 73 has a recess portion surrounded by an annular ring side wall with two notch portions. Further, adjacent to the stopper portion 73 on the base 7, a hole 75 is provided on the −Y side of the stopper portion 73, a hole 76 is provided on the +Y side, a hole 78 is provided on the +X side, and a hole 79 is provided on the −X side.

The leaf spring 6 is a leaf spring from the first end portion 61a to the second end portion 61b via the ball receiving portion 62 in the middle, and is curved in a wave shape, and two Z-shaped portions are point-symmetrically arranged with the ball receiving portion 62 as the center. The first end portion 61a and the second end portion 61b are in a circular shape, and each has a hole accepting the small column portion of the first support portion 72a or the second support portion 72b at the center. The ball receiving portion 62 is formed in a circular shape. In the present embodiment, the small column portion of the first support portion 72a is inserted into the hole of the first end portion 61a and the small column portion of the second support portion 72b is inserted into the hole of the second end portion 61b of the leaf spring 6, and the leaf spring 6 is supported by the first support portion 72a and the second support portion 72b. In this state, the ball receiving portion 62 is accommodated in the recess portion of the stopper portion 73 and the Z-shaped portion extends from the notch portion to the outside of the stopper portion 73. The ball receiving portion 62 has at its center a ball receiving hole 63 receiving the rotation center ball 43 described above. The rotation axis P passes through the center of the ball receiving hole 63. This ball receiving hole 63 has a circular shape and the diameter thereof is shorter than the diameter of the rotation center ball 43. Therefore, the inner peripheral edge of the ball receiving hole 63 supports the rotation center ball 43. Normally, the leaf spring 6 including the rotation center ball 43 does not come into contact with the stopper portion 73, and the stopper portion 73 acts as a stopper for the ball receiving portion 62 when it receives an impact.

Furthermore, on the surface on the −Z side of the base 7, cylindrical resin reservoirs 77 storing resin 77R with viscoelasticity are respectively arranged at corners on the +X,−Y side and the +X,+Y side, which are two corners of the four corners of the base 7 where no ball receiving portion is provided. The resin 77R with viscoelasticity is resin referred to as a so-called gel damper material. The two protruding portions 42 of the plate 4 described above are formed at positions opposite to these resin reservoirs 77 and inserted into the resin 77R with viscoelasticity in the resin reservoirs 77. When the movable portion 20 is rotatably driven, the resin 77R with viscoelasticity in the resin reservoirs 77 functions as a damper material suppressing the vibration of the movable portion 20 via the protruding portions 42.

In the present embodiment, in order to rotatably support the plate 4, the ball receiving portions 71a, 71b and 71c and three support balls 5 are provided in an approximately triangular region formed by the edge on the −X side and the middle portion on the +X side between the plate 4 and the base 7. The resin reservoirs 77 accepting the protruding portions 42 formed by bending a portion of the plate 4 are arranged at two corners on the +X side outside this region. Thus, in the present embodiment, since the structure for supporting the plate 4 and the structure for suppressing vibration are efficiently arranged, the downsized image sensor driving device 106 can be realized.

Further, in the present embodiment, both the plate 4 and the base 7 have a rectangular shape, and the protruding portion 42 is formed at the corner of the plate 4. As shown in FIG. 5, the fold 42r of the protruding portion 42 is parallel to the long side of the plate 4. When the movable portion 20 is rotatably driven around the rotation axis P, the protruding portion 42 inserted into the resin 77R with viscoelasticity in the resin reservoir 77 moves in a direction orthogonal to the surface 42a of the protruding portion 42. For this reason, the area receiving the reaction force from the resin 77R with viscoelasticity in the protruding portion 42 is maximized. Thus, it is possible to maximize the effect of the gel damper material suppressing the vibration of the movable portion 20.

In FIG. 4, the circuit portion for fixed portion 8 has an approximately rectangular FPC base for fixed portion 89 smaller than the ceiling plate 11 and a third FPC extension portion 88 led out from the FPC base for fixed portion 89. A coil 81a is fixed to the —Y side portion and a coil 81b is fixed to the +Y side portion on the surface on the −Z side of the FPC base for fixed portion 89. These coils 81a and 81b are opposite to the magnets 41a and 41b, and are point-symmetric with respect to the rotation axis P of the movable portion 20. Further, Hall elements 82a and 82b detecting each of the positions of the magnets 41a and 41b are arranged inside the coils 81a and 81b, respectively. A control IC (Integrated circuit) 83 controlling the Hall elements 82a and 82b is arranged outside the coil 81a (at a position spaced toward the +X direction) on the surface of the −Z side of the FPC base for fixed portion 89. Further, yokes 84a and 84b are respectively fixed to positions corresponding to the magnets 41a and 41b on the surface on the +Z side of the FPC base for fixed portion 89.

The hole 75 of the base 7 accommodates the coil 81a and the control IC 83 on the FPC base for fixed portion 89, and the hole 76 accommodates the coil 81b on the circuit portion for fixed portion 8. The surface on the −Z side of the FPC base for fixed portion 89 is fixed to the surface on the +Z side of the base 7. Hereby, the magnets 41a and 41b face the coils 81a and 81b, the Hall elements 82a and 82b, and the yokes 84a and 84b, respectively.

In the present embodiment, for example, on the surfaces on the +Z side of the magnets 41a and 41b, when the N poles are on the +X side and the S poles are on the −X side, the magnetic flux emitted from the N poles of the magnets 41a and 41b passes through a linear portion extending in the Y direction of each coil winding on the +X side of the coils 81a and 81b, reaches the yokes 84a and 84b, and further passes through a linear portion extending in the Y direction of each coil winding on the −X side of the coils 81a and 81b to reach the S poles of the magnets 41a and 41b. In the present embodiment, the magnets 41a and 41b and the yokes 84a and 84b constitute a first urging portion, and the attraction force generated between the magnets 41a and 41b and the yokes 84a and 84b acts as an urging force pressing the movable portion 20 against the fixed portion 10.

Further, in the present embodiment, the magnets 41a and 41b and the coils 81a and 81b constitute a driving portion, and by applying electric currents in opposite directions to the coils 81a and 81b, torque around the rotation axis P is generated, and the movable portion 20 is rotatably rotated. In more detail, when an electric current flows in the coil 81a, a force moving the coil 81a, for example, to the +X side, is generated due to the interaction between this electric current and the magnetic field generated by the magnet 41a, and the magnet 41a of the movable portion 20 is driven to the −X side by the reaction force of this force. Also, when an electric current in a direction opposite to the coil 81a flows in the coil 81b, a force moving the coil 81b to the −X side is generated due to the interaction between this electric current and the magnetic field generated by the magnet 41b, and the magnet 41b of the movable portion 20 is driven to the +X side by the reaction force of this force. Thus, the movable portion 20 having the magnets 41a and 41b is rotatably driven around the rotation axis P. The control IC 83 detects the positions of the magnets 41a and 41b from the voltages generated by the Hall elements 82a and 82b due to the magnetic field of the magnets 41a and 41b, and controls the electric current flowing in the coils 81a and 81b.

The third FPC extension portion 88 extends from the −Y side end portion of the FPC base for fixed portion 89 to the outside of the image sensor driving device 106 as shown in FIG. 3, and is led out in the −Z direction and fixed to the side plate 12 on the −Y side of the upper housing 1. The tip end of the third FPC extension portion 88 is connected to an external device, and a circuit supplying power from the external device to the Hall elements 82a and 82b and the control IC 83, and a circuit sending and receiving signals between the external device and the control IC 83 are formed at the third FPC extension portion 88. Further, a signal circuit from the Hall elements 82a and 82b to the control IC 83 and a circuit supplying power from the control IC 83 to the coils 81a and 81b are formed at the FPC base for fixed portion 89.

Further, as shown in FIG. 4 and FIG. 5, the two holes 78 and 79 of the base 7 extend long along the X direction, and respectively constitute a path portion allowing the passage of a portion led out in the +Z direction of the first FPC extension portion 31 or the second FPC extension portion 32. Further, the circuit portion for fixed portion 8 has a notch portion 85 at a middle portion of the edge on the +X side and a notch portion 86 at a middle portion of an edge on the −X side, and the notch portions 85 and 86 extend long along the −X direction and +X direction, respectively, and constitute a path portion allowing the passage of a portion led out in the +Z direction of the first FPC extension portion 31 or the second FPC extension portion 32. Further, a notch portion 87 allowing the passage of the first FPC extension portion 31 is provided at the −Y direction end portion of the edge on the +X side of the circuit portion for fixed portion 8. The hole 78, the hole 79, the notch portion 85 and the notch portion 86 as the path portions have a size such that the movement of the first FPC extension portion 31 and the second FPC extension portion 32 is not hindered when the movable portion 20 is rotated, and may be comprised of holes or may be comprised of notches.

Figure 8:
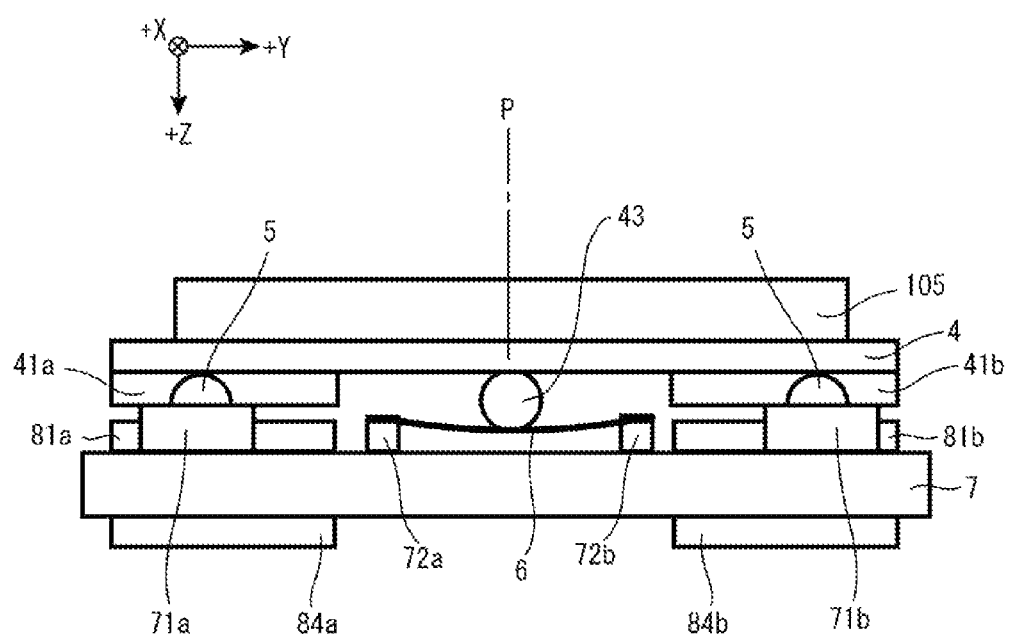
FIG. 8 is a side view of a situation where the movable portion is supported with respect to a fixed portion as viewed from an −X side.
Figure 9:
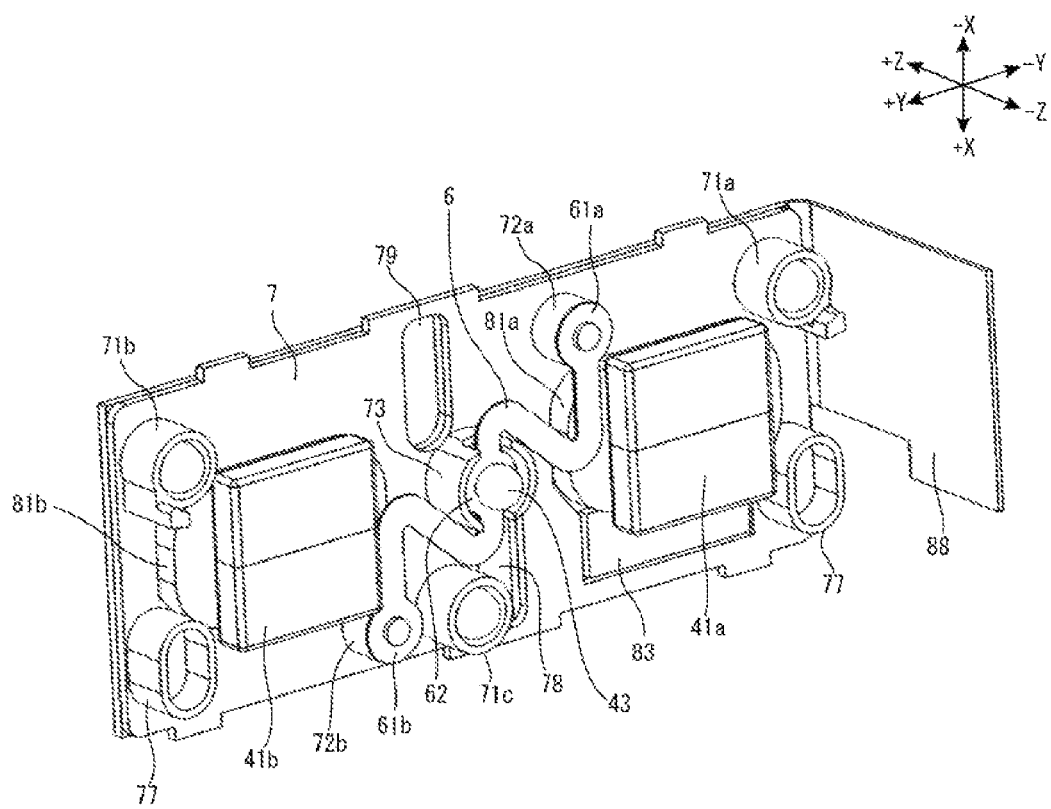
FIG. 9 is a perspective view of the fixed portion in which the housing is removed.

As shown in FIG. 8 and FIG. 9, in the present embodiment, the plate 4, which is a movable portion 20, is supported by three support balls 5 accommodated in the ball receiving portions 71a, 71b and 71c of the base 7, which is a fixed portion 10. The plate 4 is urged to the base 7 side by the attraction force between the magnet 41a and the yoke 84a and the attraction force between the magnet 41b and the yoke 84b. Therefore, the light receiving surface 107 of the image sensor 105, which is a movable portion 20, is determined to be parallel to the flat surface formed by the upper end portions of the three support balls 5. Further, the image sensor driving device 106 is adjusted so that the normal direction of the light receiving surface 107 coincides with the optical axis direction of the lens body 103.

On the other hand, in the present embodiment, the rotation center ball 43 as a fulcrum member is fixed to the surface on the +Z side of the plate 4 which is a movable portion 20. Then, both ends of the leaf spring 6 as a second urging portion are fixed to the first support portion 72a and the second support portion 72b of the base 7 which is a fixed portion 10, and the spherical lower portion of the rotation center ball 43 is in contact with the inner peripheral edge of the ball receiving hole 63 of the ball receiving portion 62 in the middle of this leaf spring 6. The leaf spring 6 is provided flexibly so that the ball receiving portion 62 is positioned slightly on the +Z side of the first support portion 72a and the second support portion 72b. That is, the rotation center ball 43 is urged to the −Z side by the leaf spring 6. As a result, the center axis connecting the lower end and the upper end of the rotation center ball 43, which is an axis connecting the center of the ball receiving hole 63 of the leaf spring 6 and the center of the center hole 45 of the plate 4, becomes a rotation axis P.

In this case, since the leaf spring 6 is an elastic body and the ball receiving hole 63 has a circular shape, the leaf spring 6 has an alignment action to keep the center axis of the rotation center ball 43 at a fixed position with respect to the base 7. Further, the urging force due to the attraction force between the magnets 41a, 41b and the yokes 84a, 84b which are the first urging portion, the urging force by the leaf spring 6 which is the second urging portion, and the driving force by the magnets 41a, 41b and the coils 81a, 81b which are the driving portion are set so that they can exert their respective actions. That is, the urging force by the first urging portion is set to be larger than the urging force by the second urging portion so that the support ball 5 does not float. Further, the driving portion provides a driving force that allows the movable portion 20 to rotate with respect to the fixed portion 10 overcoming such urging force of the first urging portion. Further, the urging force of the second urging portion has an urging force with which the rotation center ball 43 keeps holding the position of the rotation axis P even when the urging force of the first urging portion and the driving force of the driving portion exist.

As shown in FIG. 6, when the FPC base for movable portion 30 rotates around the rotation axis P as a portion of the movable portion 20, a portion of the first FPC extension portion 31 is deformed between the proximal end portion 31p and the inversion portion 31r, and a portion of the second FPC extension portion 32 is deformed between the proximal end portion 32p and the inversion portion 32r. Reaction forces which are restoring forces to restore the deformation are generated at the first FPC extension portion 31 and the second FPC extension portion 32, respectively, but since the first FPC extension portion 31 and the second FPC extension portion 32 are provided point-symmetrically with respect to the rotation axis P, the reaction forces cancel each other out, and the reaction forces moving the rotation center ball 43 from the rotation axis P are unlikely to occur.

Figure 7:
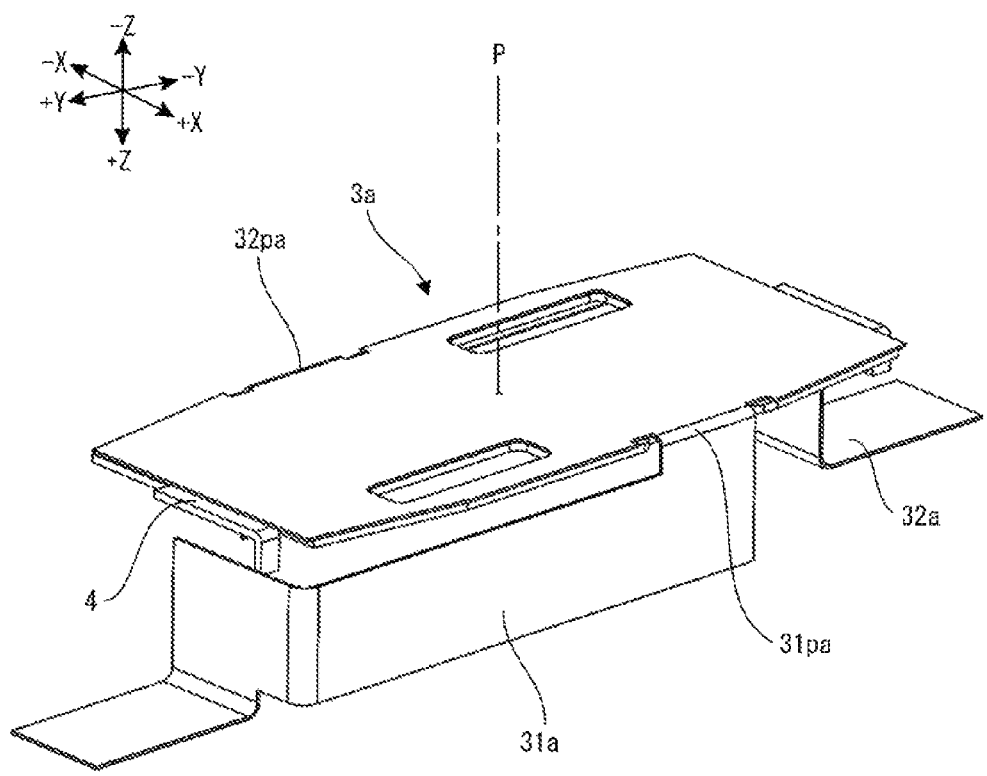
FIG. 7 is a perspective view of a circuit portion for movable portion 3a which is a variation of the circuit portion for movable portion 3.

It is to be noted that, in the circuit portion for movable portion 3 of the present embodiment, the first FPC extension portion 31 and the second FPC extension portion 32 are led out in the +Z direction from the surface on the +Z side of the FPC base for movable portion 30, but as the circuit portion for movable portion 3a shown in FIG. 7, the two edge portions of the FPC base for movable portion 30 may be used as the proximal end portions 31pa, 32pa. The first FPC extension portion 31a and the second FPC extension portion 32a are led out in the +Z direction from positions point-symmetric with respect to the rotation axis P at the respective long sides on the +X side and the −X side. The first FPC extension portion 31a extends in a strip shape in the +Y direction therefrom, hereafter, is bent in the −X direction by 90° at the corner portion on the +X,+Y side to extend, and further bent in the +Y direction by 90 degrees at the corner portion on the —X,+Y side to extend. The second FPC extension portion 32a is arranged point-symmetrically with the first FPC extension portion 31a. This circuit portion for movable portion 3a is formed in a rectangular parallelepiped shape as a whole, the FPC base for movable portion 30 forms the bottom portion of this rectangular parallelepiped, and the first FPC extension portion 31a and the second FPC extension portion 32a form the side portions of this rectangular parallelepiped.

Also in this embodiment, since the first FPC extension portion 31a and the second FPC extension portion 32a are provided so as to form point-symmetry with respect to the rotation axis P, even when the first FPC extension portion 31a and the second FPC extension portion 32a are deformed with the rotation of the movable portion 20, the reaction forces cancel each other out, and the reaction forces moving the rotation center ball 43 from the rotation axis P are unlikely to occur. Further, since the first FPC extension portion 31a and the second FPC extension portion 32a are easily deformed with respect to the displacement accompanying the rotation of the movable portion 20, the absolute value of the reaction forces can be reduced.

It is to be noted that, at the corner portion on the —X,+Y side of the first FPC extension portion 31a, it may be bent in the −Y direction, and arranged to be aligned with the second FPC extension portion 32a. Further, the proximal end portions 31pa, 32pa may be provided anywhere if they are edge portions at point-symmetric positions centered on the rotation axis P.

The above are the details of the configuration of the present embodiment. The image sensor driving device 106 of the present embodiment includes: a fixed portion 10; a movable portion 20 that supports an image sensor 105 receiving incident light passing through a lens body 103 and is rotatable relative to the fixed portion 10 around a rotation axis P passing through a light receiving surface 107 of the image sensor 105 and being orthogonal to the light receiving surface 107; a rotation center ball 43 which is a fulcrum member arranged on the rotation axis P; three support balls 5 arranged to surround the periphery of the rotation center ball 43; magnets 41a and 41b and yokes 84a and 84b which are the first urging portion urging the plate 4 which is the movable portion 20 in a direction of pressing against the base 7 which is the fixed portion 10 via the three support balls 5; a leaf spring 6 which is the second urging portion pressing by sandwiching the rotation center ball 43 between the base 7 which is the fixed portion 10 and the plate 4 which is the movable portion 20; and magnets 41a and 41b and coils 81a and 81b which are driving portions rotatably driving the movable portion 20 with respective to the fixed portion 10. The rotation center ball 43 is sandwiched between the base 7 and the plate 4 and pressed by the leaf spring 6 to determine the rotation axis position, and the support ball 5 determines the direction of the rotation surface. Therefore, it is possible to enhance the position accuracy of the rotation center of the movable portion 20.

Further, the image sensor driving device 106 of the present embodiment includes: a fixed portion 10; a movable portion 20 that supports an image sensor 105 receiving incident light passing through a lens body 103 and is rotatable relative to the fixed portion 10 around the rotation axis P passing through a light receiving surface 107 of the image sensor 105 and being orthogonal to the light receiving surface 107; and a circuit portion for movable portion 3. The circuit portion for movable portion 3 has an FPC base for movable portion 30 as the movable portion 20 expanding in parallel to the light receiving surface 107, and a first FPC extension portion 31 and a second FPC extension portion 32 led out in a direction of the rotation axis P from the FPC base for movable portion 30 at proximal end portions 31p, 32p which are point-symmetric with respect to the rotation axis P. According to the present embodiment, since the first FPC extension portion 31 and the second FPC extension portion 32 are led out in the rotation axis direction at the proximal end portions 31p, 32p point-symmetric with respect to the rotation axis P, the reaction forces of the first FPC extension portion 31 and the second FPC extension portion 32 generated by rotation can cancel each other out in the rotation axis P. For this reason, shaking of the rotation axis P caused by the FPC can be reduced.

Further, in the present embodiment, the proximal end portions 31p, 32p are provided at the edge portions or inside of the rectangular FPC base for movable portion 30 when viewed from the direction of the rotation axis P. For that reason, when viewed from the rotation of the rotation axis P, the first FPC extension portion 31 and the second FPC extension portion 32 can be contained in the range of the FPC base for movable portion 30, and the image sensor driving device 106 can be contained in the smartphone 109.

Further, the image sensor driving device 106 of the present embodiment includes: a fixed portion 10; and a movable portion 20 that supports an image sensor 105 receiving incident light passing through a lens body 103 and is movable relative to the fixed portion 10 around the rotation axis P passing through a light receiving surface 107 of the image sensor 105 and being orthogonal to the light receiving surface 107. The plate 4, which is one of the movable portion 20, has two protruding portions 42 protruding toward the base 7. The base 7, which is one of the fixed portion 10, has two resin reservoirs 77 storing gel damper material which is resin 77R with viscoelasticity into which the protruding portions 42 are inserted. The two groups of the protruding portions 42 and the resin reservoirs 77 are arranged at positions line-symmetric with respect to the rotation axis P. The protruding portion 42 protruding toward the base 7 from the plate 4 is inserted into the gel damper material of the resin reservoir 77 provided in the base 7. Thereby, since the shape and the position of the gel damper material are stable, a stable damping effect can be obtained.

It is to be noted that, in the present embodiment, the first urging portion is comprised of the magnets 41a and 41b fixed to the plate 4 which is the movable portion 20, and the yokes 84a and 84b provided at the circuit portion for fixed portion 8 which is the fixed portion 10, but the magnets may be fixed to the fixed portion 10, and the yokes may be fixed to the movable portion 20. Further, the leaf spring may be interposed between the movable portion 20 and the fixed portion 10 as the first urging portion. Further, a ball receiving portion such as a ball receiving hole receiving the rotation center ball 43 may be provided on the plate 4 of the movable portion 20.

Further, in the present embodiment, a ball receiving hole 63 is provided in the ball receiving portion 62 of the leaf spring 6, but it is sufficient that the ball receiving portion 62 has an aligning effect, and the ball receiving hole 63 is not necessarily required. For example, a tapered or mortar-shaped recess portion may be formed in the ball receiving portion 62 by drawing or the like, and this recess portion may receive the rotation center ball 43. Further, the rotation center ball 43 may be fixed to the fixed portion 10 instead of the movable portion 20, and the leaf spring 6 may be fixed to the movable portion 20. Further, the rotation center ball 43 does not need to be a ball, for example, may be formed in a hemispherical shape and fixed to the movable portion 20 or the fixed portion 10.

Further, the protruding portion may be provided at the fixed portion 10 and the resin reservoir may be provided at the movable portion 20. The resin reservoir 77 is formed by protruding cylindrically from the base 7, but may be formed as a recess portion which does not protrude. The protruding portion 42 is formed by bending the metallic plate 4, but may be formed by resin molding.

In the present embodiment, the image sensor driving device, may have a fixed portion; a movable portion that supports an image sensor receiving incident light passing through a lens and is rotatable relative to the fixed portion around a rotation axis passing through a light receiving surface of the image sensor and being orthogonal to the light receiving surface; and a circuit portion for movable portion.

The circuit portion for movable portion may have an FPC (Flexible printed circuits) base for movable portion as the movable portion expanding in parallel to the light receiving surface, and a first FPC (Flexible printed circuits) extension portion and a second FPC (Flexible printed circuits) extension portion led out in a direction of the rotation axis from the FPC base for movable portion at proximal end portions which are point-symmetric with respect to the rotation axis.

The proximal end portion may be provided at an edge portion or inside of the FPC base for movable portion in a rectangular shape, when viewed from a direction of the rotation axis.

The first FPC extension portion and the second FPC extension portion may further extend in a direction parallel to a long side of the image sensor in a rectangular shape, and be led out from a short side of the image sensor to an outside of the image sensor driving device.

The movable portion may have a rectangular plate fixing the FPC base for movable portion, the FPC base for movable portion may fix and electrically connect the image sensor, and a dimension in a direction of a short side of the plate may be the same as a dimension in the same direction of the image sensor. At a long side of the plate, a notch portion through which the first FPC extension portion or the second FPC extension portion passes through may be provided at a position point-symmetric with respect to the rotation axis. The first FPC extension portion and the second FPC extension portion passing through the notch portion may be inverted 180 degrees by sandwiching the plate, and further led out in the direction of the rotation axis at the proximal end portion. The proximal end portion may extend in the direction of the short side and be provided in the vicinity of the rotation axis. The led out first FPC extension portion and the led out second FPC extension portion may be bent in a direction parallel to the long side and further inverted by 180 degrees at an inversion portion. The inside of the inversion portion may be hardened with resin.

The proximal end portion may be provided at an edge portion of the FPC base for movable portion, and the first FPC extension portion and the second FPC extension portion may extend along the edge portion of the FPC base for movable portion.

The fixed portion may have a base rotatably supporting the movable portion and a housing forming an internal space, the base may divide the internal space into an upper space accommodating the FPC base for movable portion and a lower space accommodating the first FPC extension portion and the second FPC extension portion. The base may have a path portion through which the first FPC extension portion and the second FPC extension portion accommodated in the upper space pass to be accommodated in the lower space.

One of the fixed portion or the movable portion may have two protruding portions protruding toward the other, the other of the fixed portion or the movable portion may have two resin reservoirs storing resin with viscoelasticity into which the protruding portion is inserted, two groups of the protruding portions and the resin reservoirs may be arranged at positions line-symmetric with respect to the rotation axis. A member including the protruding portion and a member including the resin reservoir may be formed in a rectangular shape in which the direction of the long side and the direction of the short side coincide, the rotation axis may be provided at a center of the rectangular shape, the two groups of the protruding portions and the resin reservoirs may be arranged at two corner portions across the one long side. Support balls may be provided at a middle portion of the one long side and two corner portions across the other one long side, respectively, and the movable body may be supported by being pressed against the fixed portion via the support balls.

The movable portion may include a rectangular metallic plate fixing the image sensor, both ends of one long side may be bent to form the protruding portions in the plate, and folds at which the protruding portions are bent may have directions parallel to the long side of the plate.

The fixed portion may include a rectangular base rotatably supporting the movable portion, and the base may have a cylindrical resin reservoir.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image sensor driving device, comprising:
a fixed portion;
a movable portion that supports an image sensor receiving incident light passing through a lens and is rotatable relative to the fixed portion around a rotation axis passing through a light receiving surface of the image sensor and being orthogonal to the light receiving surface;
a fulcrum member arranged on the rotation axis;
three support balls arranged to surround a periphery of the fulcrum member;
a first urging portion urging the movable portion in a direction of pressing against the fixed portion via the three support balls;
a second urging portion pressing by sandwiching the fulcrum member between the fixed portion and the movable portion; and
a driving portion rotatively driving the movable portion with respect to the fixed portion.

2. The image sensor driving device according to claim 1, wherein
an urging force by the first urging portion is larger than an urging force by the second urging portion wherein the support ball does not float.

3. The image sensor driving device according to claim 1, wherein
the first urging portion comprises a magnet fixed to one of the fixed portion and the movable portion, and a yoke fixed to the other of the fixed portion and the movable portion.

4. The image sensor driving device according to claim 3, wherein
the magnet constitutes a portion of the driving portion.

5. The image sensor driving device according to claim 1, wherein
the second urging portion is a leaf spring, and in the leaf spring, both ends are fixed to one of the fixed portion or the movable portion, and a middle portion presses the other of the fixed portion or the movable portion via the fulcrum member.

6. The image sensor driving device according to claim 5, wherein
the middle portion and the fulcrum member are not in contact with the one of the fixed portion or the movable portion.

7. The image sensor driving device according to claim 1, wherein
the fulcrum member is fixed to any one of the fixed portion, the movable portion, and the second urging portion.

8. The image sensor driving device according to claim 1, wherein
the fulcrum member is in contact with any one of the fixed portion, the movable portion, and the second urging portion to perform a relative rotation motion, and this region of contact is formed in a spherical shape.

9. The image sensor driving device according to claim 1, wherein
a surface of the fixed portion with which the three support balls come into contact, and a surface of the movable portion with which the three support balls come into contact are each flat surface and are parallel to each other.

10. A camera device comprising the image sensor driving device according to claim 1.

11. An electronic apparatus comprising the camera device according to claim 10.

* * * * *